United States Patent [19]

Takvorian

[11] Patent Number: 4,860,942
[45] Date of Patent: Aug. 29, 1989

[54] METHOD FOR SOLDERING VOID-FREE JOINTS

[75] Inventor: Lawrence K. Takvorian, Costa Mesa, Calif.

[73] Assignee: Ceradyne, Inc., Costa Mesa, Calif.

[21] Appl. No.: 126,532

[22] Filed: Nov. 30, 1987

[51] Int. Cl.$^4$ ............................................. B23K 20/00
[52] U.S. Cl. ...................................... 228/220; 228/123
[58] Field of Search ................ 228/220, 221, 122, 123, 228/124

[56] References Cited

U.S. PATENT DOCUMENTS

| | | | |
|---|---|---|---|
| 2,835,967 | 5/1958 | Umblia | 228/220 |
| 3,055,096 | 9/1962 | Bertossa | 228/221 |
| 3,576,066 | 4/1971 | Steward | 228/221 |
| 3,608,187 | 9/1971 | Shutt Jr. et al. | 228/220 |
| 4,278,195 | 7/1981 | Singh | 228/123 |
| 4,375,008 | 2/1983 | Dathe | 228/221 |
| 4,566,625 | 1/1986 | Moe | 228/220 |
| 4,576,659 | 3/1986 | Lewis et al. | 228/123 |

Primary Examiner—Kurt Rowan
Attorney, Agent, or Firm—Leonard Tachner

[57] ABSTRACT

A process for soldering without using flux and producing a void-free joint comprises the steps of melting the solder in a reducing gas atmosphere such as hydrogen, evacuating the gas to permit the solder joint to expell and trapped gas, then reintroducing the reducing gas and cooling the solder joint. The reducing gas obviates the use of flux to avoid oxidation from interfering with the wetting of the materials to be joined. The materials may be metalized prior to soldering to permit wetting of certain materials such as ceramic.

9 Claims, 1 Drawing Sheet

METHOD FOR SOLDERING VOID-FREE JOINTS

BACKGROUND OF THE INVENTION

1. Field of the Invention

The present invention relates generally to a method for joining structural components and more specifically, to a method of joining structural components using soldering wherein the present invention permits such soldering without voids in the joints between such components.

2. Prior Art

Soldering as a means of joining two structural components is, of course, an old well-known technique. However, in order to assure a strong joining of the respective structural components, it is necessary in soldering to accomplish thorough wetting of the solder onto to the component surfaces to assure adherence between the components and the solder and also to assure that there are no voids or pockets within the joint which would result in a decrease of strength of the solder connection. In the prior art it is common to employ a flux in the soldering process. The flux material, which melts during the soldering of the components, coats the surfaces thereof with a material which prevents oxidation and promotes wetting by the solder. Unfortunately, flux is usually a relatively volatile material whose volatilization causes gas pockets within the joint and therefore results in an attendant loss of strength in the joint. There has therefore been a long-felt need for a method of soldering two structural components together in a manner which eliminates the need for flux so that the joint formed between the two structural components can be void-free.

SUMMARY OF THE INVENTION

The present invention utilizes a hydrogen or other reducing atmosphere in combination with an evacuation step to enhance flow, wettability and uniformity of solder joints. The result is formation of solder joint seals with no voids in the seal and with the advantage of higher strength, better heat transfer, elimination of local stress concentration and improved gas resistant sealing. Void-free joints between structural components such as ceramics and metals are soldered in an alternating environment of vacuum and reducing gas such as hydrogen. The resulting preventing of oxidation ensures good flow and wetting by the solder and eliminates the need for a flux which as previously pointed out can cause gas pockets within the joint and attendant loss of strength. An additional advantage of the use of vacuum is removal of gas pockets entrapped by the flow of solder into the joint. In a typical embodiment of the process, the surfaces of the parts to be joined are metalized with nickel and gold such as by thin film deposition or electroplating. This may be deemed extremely desirable or essential when the materials are otherwise unwettable such as ceramics or are wetted only with difficulty such a stainless steel. The parts are then assembled with solder preforms placed adjacent to the joints. A locating fixture or jig can be used to keep the parts in proper position during soldering. The assembly is then placed on a heated surface within a vessel that may be evacuated and has a gas tight capability. The vessel is closed, air is pumped out and hydrogen gas at 600 torr is admitted. After the solder melts and flows into the joint, the vessel is again evacuated to allow entrapped gas to bubble out of the joint. Hydrogen is readmitted to the vessel and the assembly is cooled. This process is applicable for ferrite-to-metal plate joints as well as for microelectronic packaging device attachment applications particularly where the absence of voids is important for strength or heat transfer purposes. The process results in complete wetting and void-free joints.

OBJECTS OF THE INVENTION

It is therefore a principal object of the present invention to provide a process for joining materials by soldering in which the joints made between the materials are completely free of voids.

It is an additional object of the present invention to provide a process for soldering which obviates the requirement for flux which must otherwise be used to reduce oxides and to improve wettability but which also otherwise produces flux vapor which is a contributing cause of voids in solder joints.

It is still an additional object of the present invention to provide a process for joining materials by soldering with void-free joints, the process characterized by steps in which the workpiece environment is first evacuated and then altered to a hydrogen or other reducing atmosphere before melting the solder and allowing it to flow into the joint and then evacuating the atmosphere to allow entrapped gas to bubble out of the joint and then again readmitting hydrogen or other reducing atmosphere into the region surrounding the joint during cooling.

BRIEF DESCRIPTION OF THE DRAWINGS

The aforementioned objects and advantages of the invention as well as additional objects and advantages thereof will be more fully understood hereinafter as a result of a detailed description of a preferred embodiment when taken into conjunction with the following drawings in which.

DETAILED DESCRIPTION OF A PREFERRED EMBODIMENT

Figure 2:
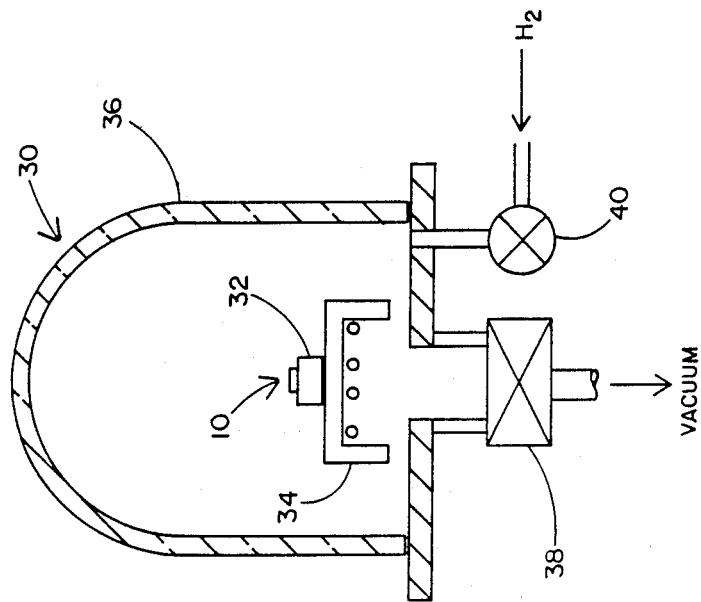
FIG. 2 is a schematic illustration of the typical equipment arrangement for soldering in accordance with the present invention.
Figure 1:
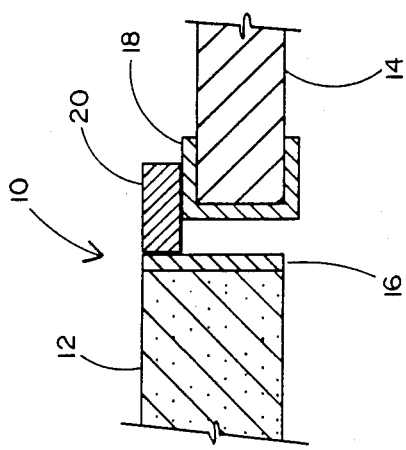
FIG. 1 is an illustrative drawing of the component setup of soldering in accordance with the present invention.

The process of the present invention may be best understood by referring to FIGS. 1 and 2 which illustrate a typical example of a preferred embodiment. In the example illustrated the process of the present invention is shown being used to join a ceramic part to a metal part. Thus, as shown in FIG. 1, a typical set up of components for soldering in accordance with the present invention would comprise a ceramic part 12 and a metal part 14 which are to be joined. In a typical version of the process of the present invention the surfaces of the parts 12 and 14 to be joined or sealed together are metalized with nickel and gold such as by thin film deposition or electroplating. This step is preferred and indeed essential when the materials are otherwise unwettable such as in the case of ceramics or are wetted only with difficulty such as the case for example, stainless steel. Thus, in the illustration of FIG. 1 the ceramic part 12 is shown with a gold-nickel coating 16 and the metal part 14 is shown with a gold-nickel coating 18. The parts 12 and 14 are positioned with one or more solder preforms 20 placed adjacent to the joints to be formed. A locating fixture or jig can be used to keep the parts in proper position during soldering.

Thus as shown in the typical arrangement 30 of FIG. 2 for carrying out the process of the present invention, a fixture 32 is illustrated as supporting the assembly 10 to be soldered with the parts positioned as shown in FIG. 1. The assembly is placed on a heated surface such as a heating plate 34 within a vacuum and gas tight vessel or bell jar 36. The vessel is closed and air is pumped out by means of a valve 38 and hydrogen gas is admitted through a valve 40 to a pressure of 600 torr. The heating plate causes the solder to melt and flow into the joint between the parts 12 and 14. After the solder has flowed and formed the joint, the vessel is again evacuated to allow entrapped gas to bubble out of the joint. Hydrogen is then readmitted to the vessel and the assembly is allowed to cool.

Using the component set-up 10 of FIG. 1 and the equipment arrangement 30 of FIG. 2, the process of the present invention may be carried out in the following steps. The components to be soldered are arranged adjacent one another with a solder preform positioned for melting between them to form the joint. If necessary, because of the nature of the parts to be joined each part is gold coated along its sealing surface in order to receive the solder which may wet such surfaces. The environment adjacent the joint to be formed between the components is evacuated and replaced with a reducing gas such as hydrogen at a selected pressure such as 600 torr. The components and the solder are heated until the solder melts and flows into the joint. The reducing gas is then evacuated from the environment surrounding the joint to allow entrapped gas to bubble out of the joint. The reducing gas is then readmitted into the atmosphere surrounding the joint and the assembly is allowed to cool. The resulting joint is free of voids thereby resulting in higher strength, better heat transfer between the parts, elimination of local stres concentration and improved resistance of the joint to gas flow.

EXAMPLE

The above-indicated invention was carried out on a specific project that required joining ferrite ceramics into metal plates. The requirements of the joints of such ceramic-to-metal soldering included minimizing open solder pores which otherwise act as traps for small particles that could damage fine mechanisms nearby. Another requirement was high strength, specifically, survivability of the joint at a loading of 12,000 G's. Attempts were made to solder the joint in air with flux and then in a vapor phase reflow system with or without flux. All such attempts were unsuccessful. The wetting and flow of solder was incomplete or at best the joint contained voids. Some improvement was observed in soldering in a vacuum but voids in the joints still persisted. Finally, the steps of evacuation and hydrogenation were tried and complete wetting and void-free joints resulted.

In view of the above-indicated example, it is quite clear that the invention is immediately applicable and highly advantageous for ferrite-to-metal plate joints. However, the invention has many other possible applications such as in the microelectronic package and device attachment operations particularly where absence of voids is important for increasing strength or heat transfer.

It will now be understood that what has been disclosed herein constitutes a new and advantageous process for joining structural components by means of soldering in a manner which results in void-free joints between such components. The invention may be characterized by the use of a reducing atmosphere around the joint during the solder melting step followed by evacuation of the atmosphere around the joint to permit entrapped gas to bubble out of the joint while the solder is melting and then readmission of the reducing atmosphere such as the hydrogen into the area surrounding the joint during the cooling of the solder. The resulting prevention of oxidation ensures good flow and wetting by the solder and eliminates the need for flux, the volatilization of which otherwise causes gas pockets within the joint and attendant loss of strength. An additional advantage of the use of vacuum is to facilitate removal of gas pockets entrapped by the flow of solder into the joint.

Those having skill in the art to which the present invention pertains will now, as a result of the applicant's teaching herein, perceive various modifications and additions which may be made to the invention. By way of example, other reducing gases besides hydrogen may be utilized. In addition, the number of cycles of evacuation and introduction of reducing gas may be increased as compared to the specific steps described herein by way of example. Furthermore, other forms of heating such as induction or radiation heating are also contemplated. Accordingly, all such modifications and additions are deemed to be within the scope of the invention which is to be limited only by the appended claims.

I claim:

1. A method for joining at least two structural elements; the method comprising the steps of:
    (a) positioning the elements to be joined adjacent one another;
    (b) placing at least one solder preform adjacent the joint to be formed between said elements;
    (c) evacuating the atmosphere surrounding the elements;
    (d) replacing said atmosphere with a reducing gas at a selected pressure;
    (e) heating said elements and solder preform until said solder preform melts and flows into said joint;
    (f) evacuating said reducing gas surrounding said joint;
    (g) surrounding said joint with a reducing gas; and
    (h) allowing said joint to cool.

2. The method recited in claim 1 further comprising the step of metalizing the joint surface of at least one said element prior to step (a).

3. The method recited in claim 2 wherein said metalizing step comprising the step of depositing gold on said joint surface.

4. The method recited in claim 3 wherein said gold depositing step comprising the step of thin film deposition.

5. The method recited in claim 3 wherein said gold depositing step comprises the step of electroplating.

6. The method recited in claim 1 wherein said reducing gas is hydrogen.

7. The method recited in claim 1 wherein at least one of said structural components is made of a ceramic material.

8. The method recited in claim 1 wherein at least one of said structural components is made of a metal.

9. The method recited in claim 1 wherein said selected pressure of said reducing gas is about 600 torr.

* * * * *